US010571052B2

(12) United States Patent
Ehsani

(10) Patent No.: US 10,571,052 B2
(45) Date of Patent: Feb. 25, 2020

(54) METHOD AND APPARATUS FOR MINING COPPER

(71) Applicant: Mohammad R Ehsani, Tucson, AZ (US)

(72) Inventor: Mohammad R Ehsani, Tucson, AZ (US)

( * ) Notice: Subject to any disclaimer, the term of this patent is extended or adjusted under 35 U.S.C. 154(b) by 151 days.

(21) Appl. No.: 15/961,590

(22) Filed: Apr. 24, 2018

(65) Prior Publication Data

US 2019/0323633 A1     Oct. 24, 2019

(51) Int. Cl.

| E21B 17/22 | (2006.01) |
| F16L 9/16 | (2006.01) |
| B29C 70/32 | (2006.01) |
| B29C 53/60 | (2006.01) |
| B29C 70/20 | (2006.01) |
| B29D 23/00 | (2006.01) |
| B29C 53/84 | (2006.01) |
| B29K 307/04 | (2006.01) |

(52) U.S. Cl.
CPC .............. *F16L 9/165* (2013.01); *B29C 53/60* (2013.01); *B29C 53/845* (2013.01); *B29C 70/205* (2013.01); *B29C 70/323* (2013.01); *B29D 23/001* (2013.01); *E21B 17/22* (2013.01); *B29K 2307/04* (2013.01)

(58) Field of Classification Search
CPC .......... E21B 43/10; E21B 17/22; F16L 9/169; B29C 53/60; B29C 53/845; B29C 70/323; B29C 70/205; B29D 23/001; B29K 2307/04
See application file for complete search history.

(56) References Cited

U.S. PATENT DOCUMENTS

| 2013/0032276 A1* | 2/2013 | Guest | B65H 18/00 156/185 |
| 2016/0053922 A1* | 2/2016 | Ehsani | B29C 63/10 138/141 |
| 2019/0032420 A1* | 1/2019 | Speer | E21B 43/10 |

* cited by examiner

*Primary Examiner* — Brad Harcourt
(74) *Attorney, Agent, or Firm* — Arjomand Law Group

(57) ABSTRACT

Mining methods and systems are disclosed for In-Situ Leaching (ISL) of the mineral ores. ISL extraction is conducted by injecting a suitable leach solution into the ore zone below the water table; oxidizing, complexing and mobilizing the minerals; recovering the pregnant (loaded) solutions through production wells (extraction wells or recovery wells); and, finally, pumping the minerals bearing solution to the surface for further processing. In these methods strips of fabrics saturated with resin are helically or non-helically wrapped around desired shape vertical mandrels, located over the wells, and the partially cured pipes are lowered into the wells to line the wells. These onsite manufactured pipes/linings are used to pump chemical solutions into the ores and subsequently to recover the pregnant (loaded) solutions.

18 Claims, 2 Drawing Sheets

METHOD AND APPARATUS FOR MINING COPPER

CROSS-REFERENCE(S) TO RELATED APPLICATION(S)

This non-provisional application is related to the U.S. patent application Ser. No. 15/684,928, filed on Aug. 23, 2017, titled "Onsite Real-time Manufacturing of Long Continuous Jointless Pipes." and to the U.S. Provisional Patent Applications No. 61/633,685, filed on Feb. 16, 2012, titled "Long Continuous Onsite-Manufactured Pipe." This application is also related to the U.S. Provisional Patent Applications No. 62/644,430, filed on Mar. 17, 2018, titled "Innovative Solutions for Pipeline Construction and Repair," the benefit of the priority date of which is hereby claimed under 35 U.S.C. § 119(e). All mentioned related applications are incorporated herein in their entirety by reference.

TECHNICAL FIELD

This application relates generally to Mining. More specifically, this application relates to a method and apparatus for extraction of copper.

BRIEF DESCRIPTION OF THE DRAWINGS

The drawings, when considered in connection with the following description, are presented for the purpose of facilitating an understanding of the subject matter sought to be protected.

DETAILED DESCRIPTION

While the present disclosure is described with reference to several illustrative embodiments described herein, it should be clear that the present disclosure should not be limited to such embodiments. Therefore, the description of the embodiments provided herein is illustrative of the present disclosure and should not limit the scope of the disclosure as claimed. In addition, while the following description references copper mining from under certain geological layers, it will be appreciated that the disclosure may include mining other metals, minerals, and substances buried under different geological makeup.

Open pit mining has been used almost exclusively until now in all copper mines. This process scars the surface of the earth and leads to an environmental ruin that most communities reject. Thus obtaining a permit to build and operate a new open pit copper mine is very difficult and the environmental impact is devastating.

Figure 1:
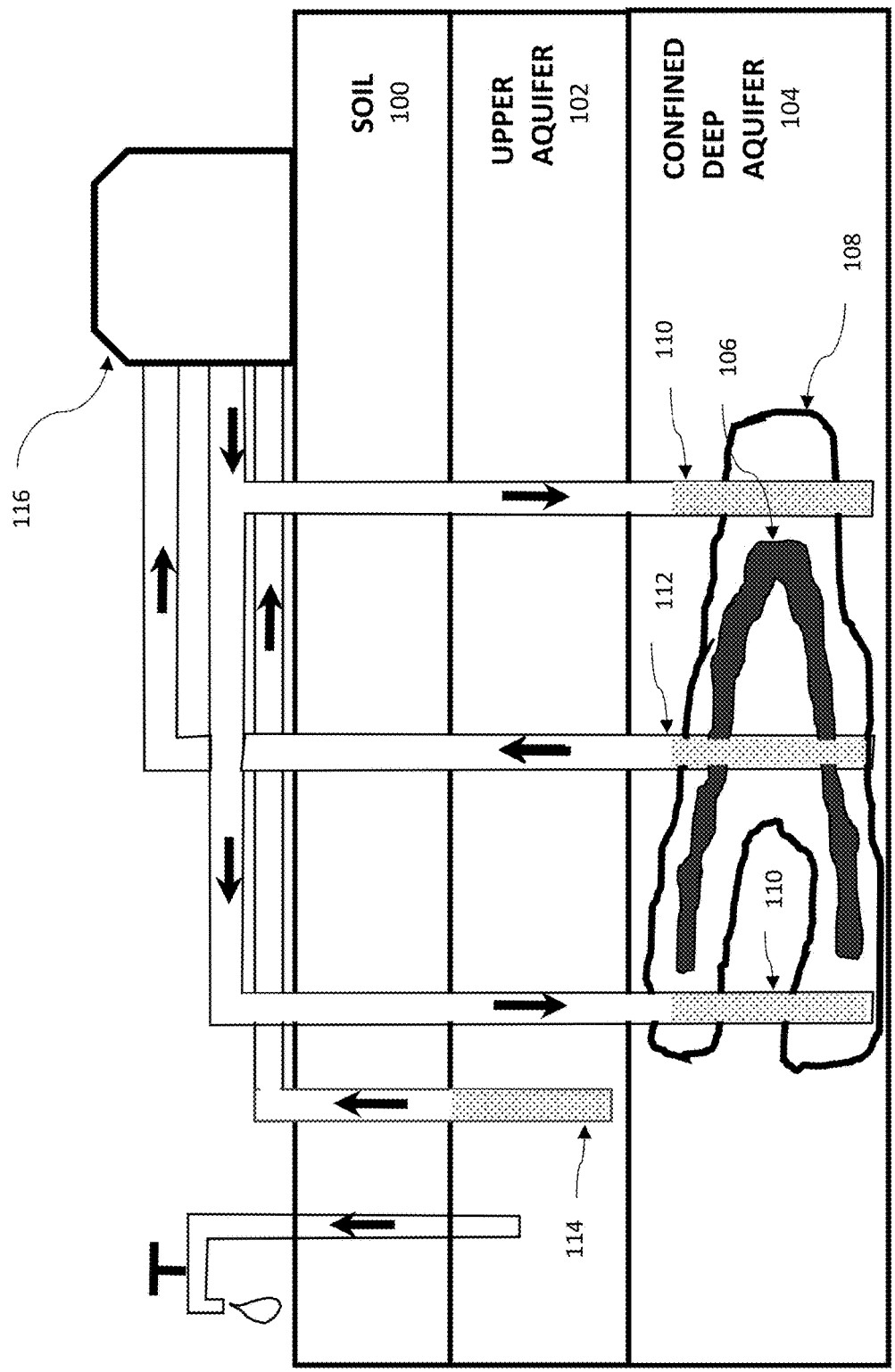
FIG. 1 schematically illustrates the In-Situ Leaching (ISL) method of mining uranium.

In contrast, In-Situ Leaching (ISL) shown in FIG. 1 is a relatively new and increasingly applied method of uranium and copper recovery, which costs less than the traditional method and has a smaller environmental impact in appropriate hydrogeological circumstances compared with other methods of uranium and copper recovery (www.youtube-.com/watch?v=S2voGV06M8s).

ISL is defined as the extraction of uranium or other minerals from the host sandstone (in general, sedimentary formations dominated by highly permeable sandstone) by chemical solutions (lixiviants) and the recovery of the minerals at the surface. ISL extraction is conducted by injecting a suitable leach solution into the ore zone below the water table; oxidizing, complexing and mobilizing the minerals; recovering the pregnant (loaded) solutions through production wells (extraction wells or recovery wells); and, finally, pumping the minerals bearing solution to the surface for further processing. Recently, copper mines are also starting to utilize this technology. Gunnison (Excelsior) Mine 60 miles east of Tucson, Ariz. is one of the first coper mines in the U.S. that has received a permit for ISL in 2017. At the present time a potash mine in north-central Michigan with an estimated value of $65 billion is also being planned to utilize the ISL technology.

In order to reach optimum penetration of the leach solution to the mineral's ore, a well-defined system of injection and extraction wells (wellfields), both equipped with filter (screen) sections covering the ore horizon, is constructed. The geometry of wellfield patterns (regular 5-spot or 7-spot networks, line drives and 'wall' geometries or irregular systems corresponding to specific ore morphologies) and the spacing between injection and extraction wells have to be adjusted to orebody characteristics in order to establish a stable hydrological pumping regime at a suitable flow rate. In order to avoid or minimize the migration of mining fluid into the environment, a bleed from the lixiviant cycle ranging up to a few percent is usually applied. A network of additional wells around the mining zone is used to monitor and control wellfield performance within the mining horizon as well as in neighboring formations.

Acid and alkaline leach technologies employ acid and alkaline based leaching systems, respectively. Dilute sulfuric acid is normally used for the former, and carbonate or bicarbonate based leach solutions are used for the latter. For example oxygen or hydrogen peroxide is typically added to maintain the strongly oxidizing conditions required to oxidize tetravalent uranium in ore minerals to its hexavalent stage, thus forming uranyl ions ($UO_2 2-$) that undergo complexation either with sulfate or carbonate ions. After recovery of the anionic uranyl (sulfate or carbonate) complexes from the pregnant lixiviant, either by ion exchange, which is predominantly applied, or solvent extraction, barren lixiviant is refortified by dosing the above chemicals in a controlled manner, thus forming a continuous lixiviant recycle. The total amount of mining fluid in the lixiviant cycle for a given wellfield operation is mainly determined by the (effective) pore volume available for fluid transport in the mineralized aquifer.

FIG. 1 schematically illustrates the In-Situ Leaching (ISL) method of mining uranium. As seen in this example, the uranium ore is within the confined deep aquifer layer 104 of ground, under the soil layer 100 and the upper aquifer layer 102. One or more leaching compound are pumped through lined wells 110 into the uranium ore 108 that is within layer 104 of the ground to dissolve the uranium 106 into a liquid compound. The liquid uranium compound is subsequently pumped back to the surface through the lined well 112 and sent to the extraction center 116, where the uranium is reclaimed and extracted from the liquid uranium compound.

Water within the water table 102 is also pumped up from the lined wells 114 and tested to monitor the quality of the water in the water table 102 and to provide feedback for the entire system.

In Gunnison copper mine, for example, 3,000 wells, each about 1,000 feet deep will be drilled on a 50-ft×50-ft grid.

These wells will be lined with pipes. The current plan is to buy 30-ft long fiberglass pipes off the shelf, which do not corrode at the presence of acids, and connect them together with couplers and lower them into the well. There are several problems with this approach:
1. The mine has to purchase the pipes and pay for them in advance before they are manufactured and delivered to the jobsite.
2. There is added expense associated with shipping bulky pipes.
3. The wells pass through one or more layers of underground aquafer; if any of the joints leak chemicals into the aquafer, this could be a major environmental disaster for the mines. Keep in mind that every joint in the 1000-ft long pipe is a potential source of leak.
4. The heavy pipe segments, when connected together to make a 1000-ft long pipe become very heavy and will be difficult to support such a heavy and long pipe inside the well during installation. This requires massive cranes on site and significantly reduces production rate while adding to the pipe installation costs.
5. The internal pressure (from solutions inside the pipe) and the external pressure (from grouting around the pipe) are maximum at the bottom of the well and gradually reduce to nearly zero at the top of the well. However, all of the pipe segments are designed for the same forces. This results in an inefficient design near the top of the well. Said another way, there is not a constant factor of safety against failure for this pipe. The factor of safety is lowest at the bottom of the well and it increases significantly near the top of the well.
6. The couplers in the pipes result in a bulge at the end of each pipe segment. This leads to the need for a larger hole or bore diameter for the well and more volume of grout to fill the annular space. Both of these add significant cost to the project.

To overcome the above shortcomings a new onsite manufactured pipe is disclosed that can be used as the casing/lining for these wells. The technology is equally applicable to casing wells for irrigation, drinking water, fracking operations and other oil and gas pipes. The pipe is made of Carbon, Glass, Kevlar, Basalt, etc. in a process known as Fiber Reinforced Polymer (FRP).

Figure 2:
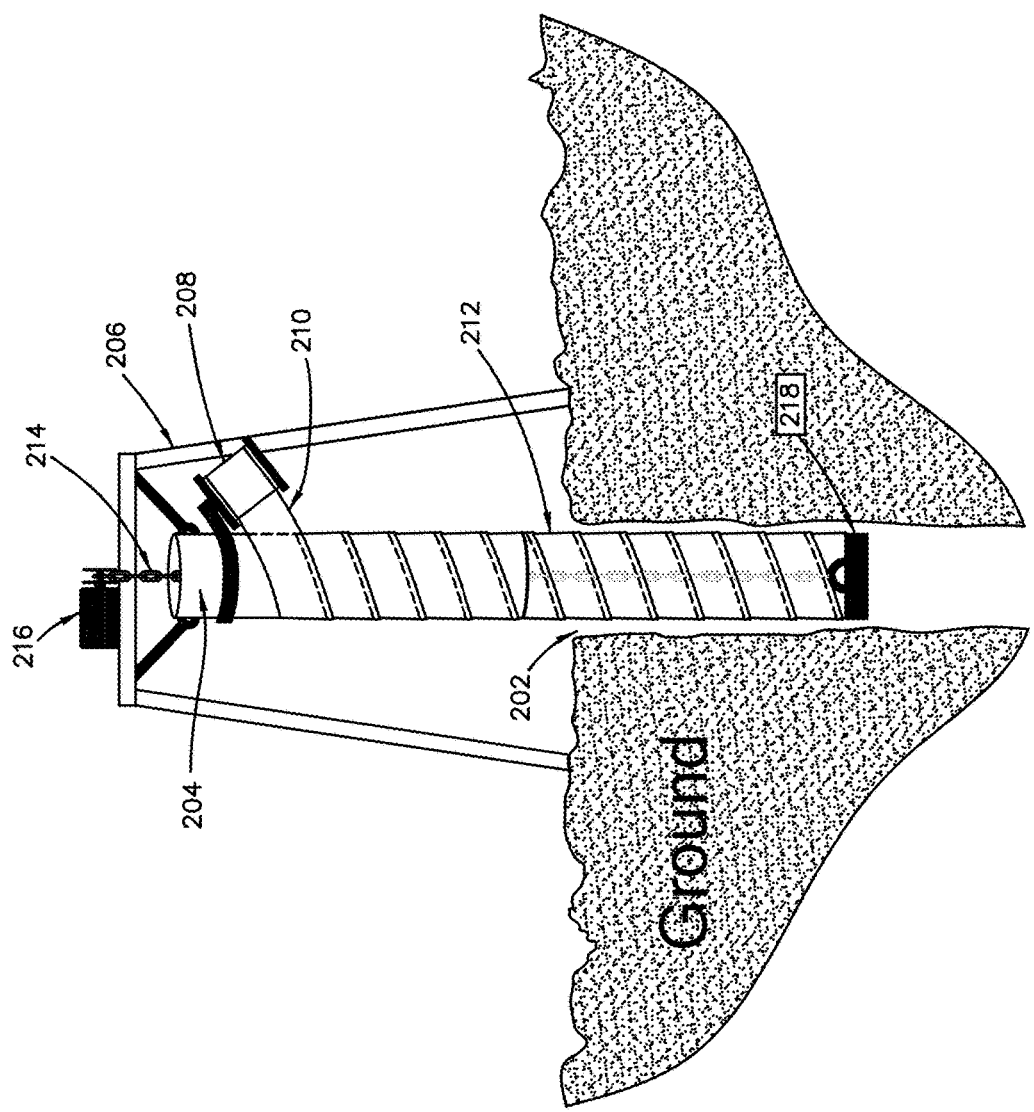
FIG. 2 shows an example method of on-site manufacturing of seamless/one-piece pipes of varying thickness, to be used with ISL method of mining, according to one embodiment of the present disclosure.

In an example embodiment, as shown in FIG. 2, a mandrel 204 having an outside diameter equal to the internal diameter of the pipe 212 (to be manufactured) is provided and hung from a frame 206 directly above the well 202. Various layers of resin-saturated carbon or glass FRP fabric 210 are wrapped helically or non-helically (in overlapping individual bands) around the mandrel 204. The fabric strip 210, in some embodiments, may be unwound from one or more spools 208 that can revolve around mandrel 204. In one embodiment the resin can cure very fast (in about 3 minutes) at a temperature of 300 F. This allows the wrapped FRP layers to become a hard pipe 212 in a few minutes.

In some embodiments additional strips of reinforcement materials may be longitudinally placed between the wrapped layers of the pipe 212. In other embodiments sheets of reinforcement materials may be wrapped, non-helically between, under, and/or over the wrapped layer(s) of the pipe 212. In some embodiments there may not be any other wrappings except for these non-helical wrappings of these sheet materials. Such non-helically wrapped sheets of reinforcement materials may overlap each other along the longitudinal axis of the pipe 212. In all the overlapping wrappings, helical or non-helical, the percentage of the overlap is adjusted at least based on the material and the required strengths of the pipe 212.

The formed pipe 212 is subsequently slipped off the tapered or non-tapered mandrel 204 into the well 202, but the upper end of the pipe 212 is kept on the mandrel 204. The process of wrapping layers of FRP 210 continues and is repeated for as long as it is needed to create a continuous pipe 212 of infinite length.

While the pipe 212 is lowered into the well 202, its lower end is, for example, connected to a cable 214 through the bottom-support 218. The cable 214 is controllably lowered into the well 202, for example, by stepping motor 216, which is supported by the frame 206. The cable 214 and bottom-support 218 keep the pipe 212 from falling into the well 202. Cable 214 helps to gradually lower the pipe 212 into the well 202, where the rate of lowering is the same as the rate of formation of pipe 212. Depending on the method of the formation of the pipe 212, the lowering of the pipe 212 into the well 202 may be continuous or in steps. For example the pipe 212 may be continuously lowered as the strip 210 is being wound around mandrel 204 or the pipe 212 is only lowered if the entire length of mandrel 204 is wound around. In the latter case the spool 208 may also travel up and down the mandrel 204. In the former case the turning of the spool 208 around the mandrel 204 and the lowering of the cable 214 may be synchronized and the faster the strip 210 is wound around mandrel 204, the faster the pipe 212 is lowered into the well 202.

In one embodiment the newly wound pipe segment can be resting on the mandrel while it is cured and then partially slipped off. In another embodiment, the process will be continuous without a substantial pause such that as the FRP layers are being wrapped in one part of the mandrel, the wrapped portion on another part of the mandrel is being cured.

In various embodiments the wrapping of FRP layers around the mandrel can be done manually. Workers can stand on platforms along the height of the mandrel and wrap the FRP around the mandrel. Multiple crews may be used simultaneously with each crew standing at a different elevation and being responsible for wrapping a certain length of the mandrel. In embodiments in which the wrapping is done mechanically, the process of the wrapping may be preprogrammed and the number of layers and the layer materials at each location along the pipe may be automatically controlled according to the program.

In various embodiments, the heating of the pipe and mandrel for curing of the resin can be done from outside or inside using light, heat, electrical current, chemical reaction, gas, etc. It is also possible to modify the resin, for example by introducing carbon nanotubes or other products, such that when an electrical current is introduced, the resin heats up and cures rapidly.

The technique discussed here is very fast and if a 20-ft long mandrel is used, it can produce 20 feet of pipe in roughly 5 minutes, 1 minute to wrap the FRP around the mandrel, 3 minutes to cure the resin and another minute to lower the finished segment into the well. That is a production rate of 4 feet per minute. So, a 1000-foot-long pipe can be made in approximately 250 minutes or 4.5 hours. The advantage of this system is that this time includes both the construction and placement of the pipe—starting from scratch.

In some embodiments the resin used in this technique is cured when exposed to UV light. Some resins in this category can cure in seconds. The curing of the pipe can be done while the pipe is on the mandrel or after the pipe is removed from the mandrel. For example, a string of UV lights can be placed inside the well and when the pipe is pushed into the well, the curing will continue or begin inside the well.

In some embodiments, the pipe construction may include spacer materials such as 3D fabric, Coremat®, foam, or other products placed between or under or on top of the layers of FRP for additional rigidity (or increased ring stiffness). Those skilled in the art realize that the ability of a pipe to resist external loads is proportional to its ring stiffness. When these 1000-ft pipes are inserted into a well, often times the annular space between the pipe and the well is filled with grout or concrete. The weight of the wet grout exerts high pressures on the outside of the pipe. For Gunnison Mine, for example, this pressure is around 500 psi which is significantly larger than the internal pressure from the fluids inside the pipe. Therefore, a pipe with high ring stiffness must be designed and constructed.

The internal and external pressure exerted on the pipe is a function of the depth. In other words, the loads acting on the pipe are maximum at the bottom of the well and they gradually reduce as they approach the top of the well (i.e. at ground elevation). When pre-manufactured pipes are used, all of the pipe segments will have the same strength. Therefore, after installation, the pipe segments near the bottom of the well will be more highly stressed (a lower factor of safety against failure) compared to the pipe segments near the ground that are less stressed (resulting in a higher factor of safety). This is a waste of materials; civil engineers prefer to have designs that have a uniform factor of safety (or probability of failure). Modern building and bridge codes have been calibrated to produce a uniform factor of safety throughout the structure. One of the advantages of the technique presented here is that in some embodiments the number of layers of materials being wrapped around the mandrel can be easily changed along the 1000-ft length of the pipe. For example, it is very easy to build a pipe where the bottom 200 feet has 8 layers (wraps) of FR fabric, and the number of these wraps reduced by one wrap for every 200 feet, leading to only 2 or 3 wraps of FRP fabric in the upper 200 feet of the pipe. This approach brings significant savings to the cost of the pipes for the project. The calculations for the number of layers of FRP must be performed by an engineer familiar with these products.

Similar to what was introduced in the above paragraph, the regions of the pipe that will be placed adjacent to the aquifer, may require a more robust design to make sure no chemicals leak and contaminate the water. This can be easily achieved by adding one or more layers of FRP fabric to the pipe over the depth adjacent to the aquifer.

In some installations the long pipe may have to hang from the mandrel without the help of cable 214. That requires the pipe to be strong enough in the longitudinal direction to support its weight. The axial load on the pipe will be largest near the top of the well and it reduces to nearly zero at the bottom of the well. Engineers can design the required amount of fibers aligned along the length of the pipe to resin these loads. One advantage of the disclosed method and system is that the amount and/or the direction of these fibers can vary along the length of the pipe to achieve the optimum strength at each elevation with little waste of materials. When unidirectional fabric is wrapped around the mandrel, the angle of the wrapping of the fabric will allow engineers to calculate the component of the force resisted by the fabric in the hoop and longitudinal directions. Similarly if a biaxial fabric with fibers in zero and ninety degree orientation is used, engineers can calculate the strength of the pipe in longitudinal and hoop directions. By changing the angle of the helically-wrapped fabrics along the length of the pipe and the number of wraps or overlap of each consecutive layer of fabric, the strength of the pipe can be modified along its length.

In some embodiments additional strips of FRP fabric can be placed along the length of the mandrel with the fibers aligned with the axis of the pipe. These fabrics contribute to the axial strength of the pipe that carries the weight of the pipe. The number of these strips can vary along the length of the pipe to achieve the optimum weight-carrying strength for the pipe.

A further advantage of this system is that the outside diameter of the pipe can be cylindrical with no bulges. This allows for the boring of a smaller diameter well and less grout to be injected in the annular space, both of which reduce the cost of the project.

Changes can be made to the claimed invention in light of the above Detailed Description. While the above description details certain embodiments of the invention and describes the best mode contemplated, no matter how detailed the above appears in text, the claimed invention can be practiced in many ways. Details of the system may vary considerably in its implementation details, while still being encompassed by the claimed invention disclosed herein.

Particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the claimed invention to the specific embodiments disclosed in the specification, unless the above Detailed Description section explicitly defines such terms.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The above specification, examples, and data provide a complete description of the manufacture and use of the composition of the invention. Since many embodiments of the invention can be made without departing from the spirit and scope of the invention, the invention resides in the claims hereinafter appended. While the present disclosure has been described in connection with what is considered the most practical and preferred embodiment, it is understood that this disclosure is not limited to the disclosed embodiments, but is intended to cover various arrangements included within the spirit and scope of the broadest interpretation so as to encompass all such modifications and equivalent arrangements.

What is claimed is:

1. A method of lining a well by a jointless pipe, the method comprising:
   hanging a mandrel substantially vertically from a platform over the well;
   wrapping, helically or non-helically, a sheet of reinforced material around the mandrel, wherein the wrapped sheet of material forms a pipe segment around the mandrel;
   lowering at least a part of the pipe segment into the well such that a part of the pipe segment remains on the mandrel, wherein resin used during the wrapping is at least partially cured before the pipe segment is lowered into the well; and
   repeat the wrapping and the lowering steps as many times as necessary to line a desired length of the well, wherein the pipe segments are all attached to each other and form the jointless pipe.

2. The method of claim 1, wherein the mandrel is slightly tapered down from top of the mandrel towards bottom of the mandrel.

3. The method of claim 1, wherein each pipe segment is comprised of more than one layer of wrapping.

4. The method of claim 1, wherein wrappings are performed manually or mechanically.

5. The method of claim 1, wherein a number of the wrapped layers is progressively increased from top of the pipe to bottom of the pipe.

6. The method of claim 1, wherein a weight of the hung pipe is supported from bottom of the pipe by a cable extended to outside of the well.

7. The method of claim 1, wherein wrappings are performed mechanically and are preprogrammed.

8. The method of claim 1, wherein the reinforced sheet material is Fiber Reinforced Polymer (FRP).

9. The method of claim 1, wherein a number of layers of wrappings is different at different locations along a length of the pipe to achieve different desired strengths at each desired location.

10. A method of lining an In-Situ Leaching (ISL) well by a one-piece pipe for mining minerals, the method comprising:
    Manufacturing the one-piece pipe, onsite, by continuously wrapping, helically or non-helically, a resin impregnated sheet of reinforced material around a mandrel and lowering a part of the wound sheet into the well as the winding progresses wherein the resin used during the wrapping is at least partially cured on the mandrel before the pipe is lowered from the mandrel into the well.

11. The method of claim 10, wherein the helical windings are overlappingly wound and the non-helical wrapped sheets either overlap each other along a length of the pipe or are butt-joined and are attached together by a third sheet that overlaps both of the butt-joined sheets.

12. The method of claim 10, wherein the pipe is comprised of more than one layer of wrapping and wherein the layers include one or more layers of a spacer sheet, Coremat®, honeycomb, or 3D fabric.

13. The method of claim 10, wherein wrappings are performed manually or mechanically.

14. The method of claim 10, wherein a number of the wrapped layers of the pipe is progressively increased from top of each well to bottom of the well.

15. The method of claim 10, wherein a weight of the hung pipe is supported from bottom of the pipe by a cable extended to outside of the well.

16. The method of claim 10, wherein wrappings are performed mechanically and are preprogrammed.

17. The method of claim 10, wherein the reinforced material is Fiber Reinforced Polymer (FRP).

18. The method of claim 10, wherein a number of layers of wrappings is different at different locations along a length of the well lining to achieve different desired strengths at each desired location.

* * * * *